US012748024B2

(12) United States Patent
McPherson et al.

(10) Patent No.: US 12,748,024 B2
(45) **Date of Patent: *Sep. 29, 2026**

(54) SHAFT TESTING DEVICE WITH NON-CONTACT BEARING

(71) Applicant: MCP IP, LLC, Sparta, WI (US)

(72) Inventors: Mathew A. McPherson, Norwalk, WI (US); John R. Scovil, Scottsdale, AZ (US); Mark J. Hayes, Onalaska, WI (US)

(73) Assignee: MCP IP, LLC, Sparta, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,911

(22) Filed: Oct. 2, 2023

(65) Prior Publication Data

US 2024/0027316 A1 Jan. 25, 2024

Related U.S. Application Data

(63) Continuation of application No. 16/840,368, filed on Apr. 4, 2020, now Pat. No. 11,774,333.

(60) Provisional application No. 62/829,286, filed on Apr. 4, 2019.

(51) Int. Cl.
*G01N 3/08* (2006.01)
*G01N 3/06* (2006.01)

(52) U.S. Cl.
CPC ............... *G01N 3/08* (2013.01); *G01N 3/066* (2013.01); *G01N 2203/0019* (2013.01); *G01N 2203/0411* (2013.01)

(58) Field of Classification Search
CPC ............ G01N 3/20; G01N 3/08; G01N 3/066; G01N 2033/008; G01N 2033/0411; G01N 2033/0019; G01N 2033/04; G01N 2033/0441; G01N 2033/0023; G01N 2033/0274
See application file for complete search history.

(56) References Cited

U.S. PATENT DOCUMENTS

| | | | |
|---|---|---|---|
| 2,404,584 | A | 7/1946 | Liska et al. |
| 3,142,174 | A | 7/1964 | Baker |
| 4,662,291 | A | 5/1987 | Bardsley |
| 6,024,491 | A | 2/2000 | Bak |
| 6,282,036 | B1 | 8/2001 | Woytassek et al. |
| 6,918,306 | B1 | 7/2005 | Cavallaro et al. |
| 7,788,982 | B2 | 9/2010 | Dee et al. |
| 8,028,587 | B2 | 10/2011 | Dee et al. |
| 8,590,393 | B2 | 11/2013 | You |

(Continued)

OTHER PUBLICATIONS

New Way Air Bearings, "Radial Air Bearing Design Guide", 2011, <https://www.newwayairbearings.com/wp-content/uploads/2023/04/Radial-Air-Bearing-Design-Guide-revision-date-3JUNE2024.pdf> (Year: 2011).*

*Primary Examiner* — Jonathan M Dunlap
(74) *Attorney, Agent, or Firm* — Laabs Intellectual Property

(57) ABSTRACT

In some embodiments, a shaft testing device comprises a support comprising a non-contact bearing. The support is arranged to support a workpiece such as a shaft. A loading mechanism comprises a non-contact bearing. The loading mechanism is arranged to apply a load to the shaft. In some embodiments, the load is applied orthogonal to a longitudinal axis of the shaft. In some embodiments, a non-contact bearing comprises an air bearing.

20 Claims, 15 Drawing Sheets

(56) References Cited

U.S. PATENT DOCUMENTS

| | | | |
|---|---|---|---|
| 8,608,531 | B1 | 12/2013 | Huang |
| 8,753,014 | B2 | 6/2014 | Devitt |
| 9,046,452 | B1 | 6/2015 | Huang |
| 10,247,649 | B2 | 4/2019 | Landwehr |
| 10,365,233 | B2 | 7/2019 | Price et al. |
| 10,612,589 | B2 | 4/2020 | Sotiropoulos |
| 11,774,333 | B2 | 10/2023 | McPherson et al. |
| 2008/0264179 | A1 | 10/2008 | Dee et al. |
| 2009/0040874 | A1 | 2/2009 | Rooney et al. |
| 2012/0073383 | A1 | 3/2012 | You |
| 2013/0149055 | A1 | 6/2013 | Tsai |
| 2017/0284798 | A1 | 10/2017 | Kavousian |
| 2019/0265135 | A1 | 8/2019 | Jeong et al. |

* cited by examiner

SHAFT TESTING DEVICE WITH NON-CONTACT BEARING

CROSS-REFERENCE TO RELATED APPLICATIONS

This is a continuation of U.S. patent application Ser. No. 16/840,368, filed Apr. 4, 2020, which claims the benefit of U.S. Patent Application No. 62/829,286, filed Apr. 4, 2019, the entire contents of which are hereby incorporated herein by reference.

BACKGROUND OF THE INVENTION

This invention relates generally to mechanical testing devices and more specifically to a testing device arranged to support and deflect shafts.

Various types of shafts are known in the art. Shafts are often tubular and can be made from any suitable material, such as metals, plastics, fiberglass, carbon fiber, etc. Shafts can include arrow shafts, golf club shafts or any other suitable type of shaft.

Arrows are generally known in the art. Arrows are known to bend along their length during launch and to rebound and oscillate in bending deflection as the arrow travels toward the target. An arrow "spine" is often defined in the art as a measurement of lateral deflection of an arrow in response to a predetermined lateral bending load.

An arrow shaft often has a cylindrical shape and is designed to have uniform strength characteristics about its circumference and along its length; however, real-world conditions generally prevent arrow shafts from having truly uniform strength characteristics. Although an arrow may appear uniform in construction to the naked eye, spine testing will generally reveal strength differentials as the arrow is rotated, allowing an archer to find and orient a "strong axis" and/or a "weak axis" for the arrow. An archer can achieve more consistent shooting results if the different arrows used by the archer are as similar as possible. Therefore, archers will often measure arrows to find and orient a particular axis. For example, an archer might measure a group of arrows to find the weak axis for each arrow, then orient the nock of each with respect to the weak axis in a similar manner. This helps to ensure that the weak axis location/vector is similar from arrow to arrow.

There remains a need for devices capable of testing shafts to determine the location and orientation of a weak axis, or that of a weakest deflection vector.

All US patents and applications and all other published documents mentioned anywhere in this application are incorporated herein by reference in their entirety.

BRIEF SUMMARY OF THE INVENTION

In some embodiments, a shaft testing device comprises a support comprising a non-contact bearing. The support is arranged to support a workpiece such as a shaft. A loading mechanism comprises a non-contact bearing. The loading mechanism is arranged to apply a load to the shaft. In some embodiments, the load is applied orthogonal to a longitudinal axis of the shaft.

In some embodiments, a non-contact bearing comprises an air bearing.

In some embodiments, a shaft testing device comprises a first support comprising a first air bearing and a second support comprising a second air bearing. The first support and the second support are arranged to support a shaft. A loading mechanism comprises a loading air bearing arranged to apply a load to the shaft.

In some embodiments, the shaft testing device comprises a base. The first support is engaged with the base and the second support is engaged with the base. In some embodiments, the supports are slidably engaged with the base.

In some embodiments, a support comprises a first body portion moveable with respect to a second body portion. The first body portion is engaged with the base and the second body portion comprises the first air bearing. In some embodiments, the first body portion is pivotable with respect to the second body portion. In some embodiments, the support comprises a spring contacting the first body portion and the second body portion.

In some embodiments, the second support is shaped similarly to the first support, the first support and second support having opposite orientations.

In some embodiments, the loading mechanism is located between the first support and the second support.

In some embodiments, the loading mechanism is moveable with respect to the shaft.

In some embodiments, a fluid line is in fluid communication with the first air bearing. In some embodiments, a fluid line is in fluid communication with the loading air bearing.

In some embodiments, a support comprises a body and an adapter, and the adapter comprises the air bearing.

In some embodiments, the loading mechanism comprises a body and an adapter, and the adapter comprises the loading air bearing.

In some embodiments, the loading mechanism comprising an actuation mechanism arranged to move the loading air bearing between a first position and a second position. In some embodiments, the loading mechanism comprises an adjustment mechanism arranged to move the actuation mechanism and the loading air bearing with respect to the first support.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
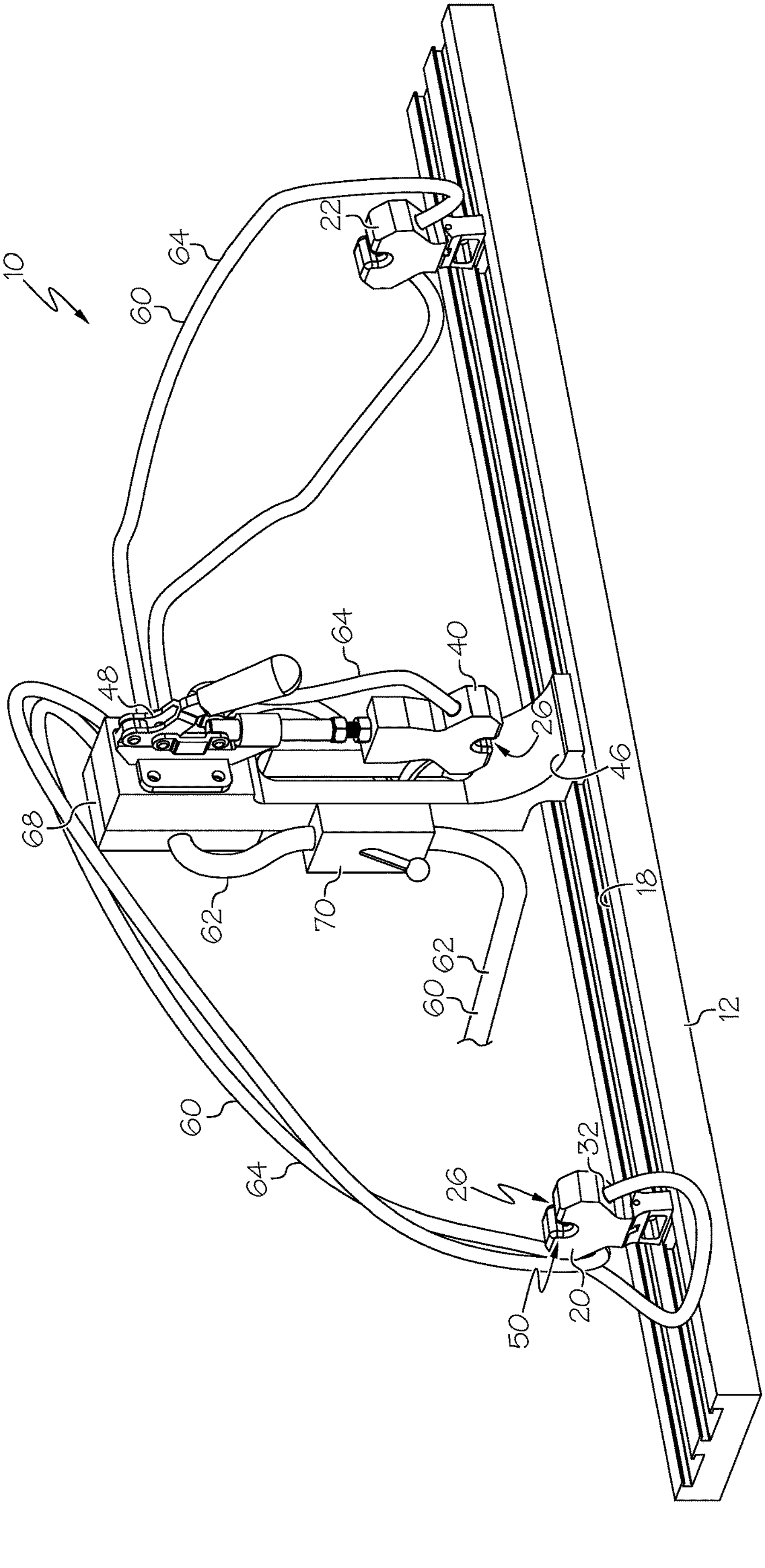
FIG. 1 shows an embodiment of a testing device.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
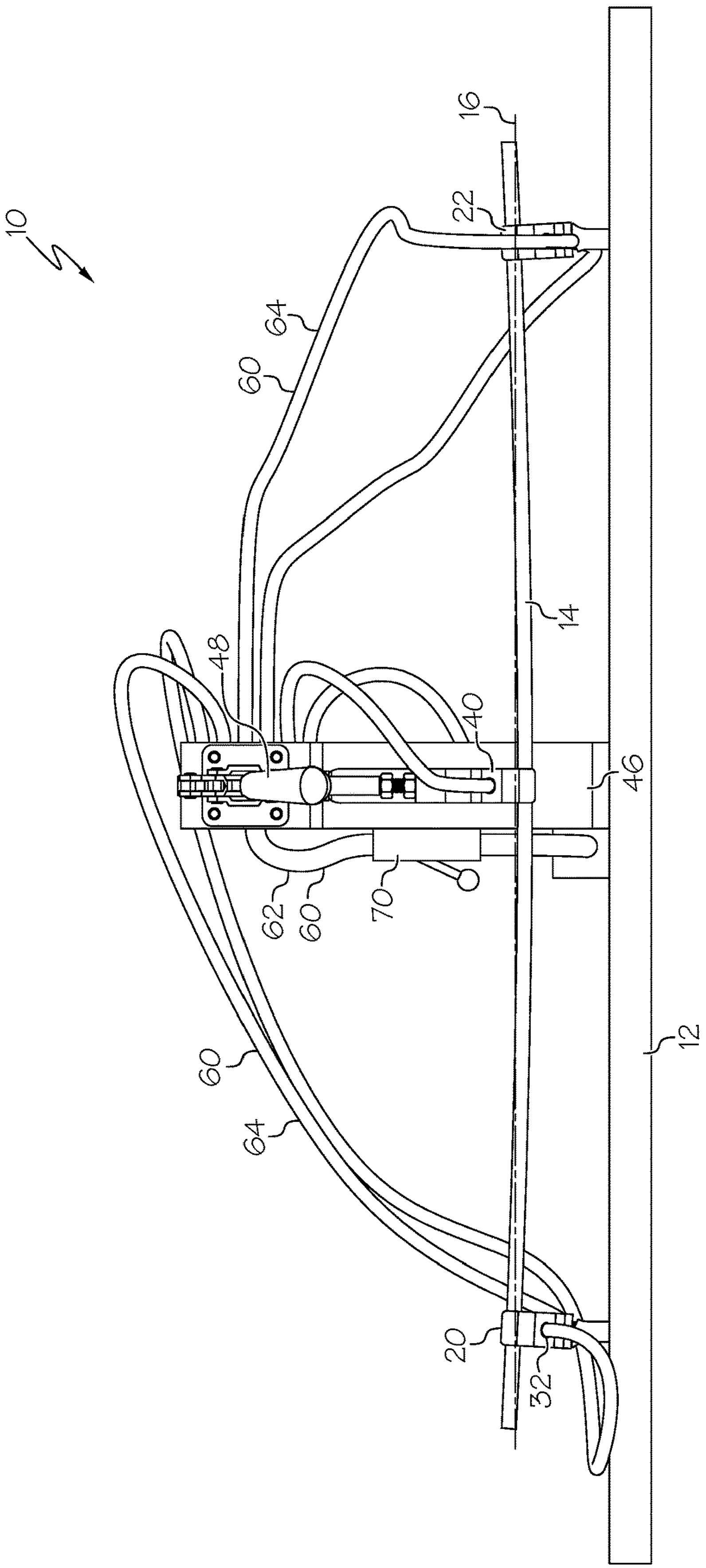
FIG. 2 shows another view of the testing device shown in FIG. 1.

FIGS. 1 and 2 shown an embodiment of a testing device 10. In some embodiments, the testing device 10 is arranged to support a workpiece, such as a shaft 14, and determine a weak bending axis or a weak bending vector for the shaft 14.

In some embodiments, the testing device 10 comprises a support 20 arranged to support the shaft 14 and a loading mechanism 40 arranged to apply a load to the shaft 14.

In some embodiments, the testing device 10 comprises a first support 20 and a second support 22 arranged to collectively support a shaft 14. In some embodiments, the first support 20 is arranged to support the shaft 14 at a first location and the second support 22 is arranged to support the shaft 14 at a second location that is spaced apart from the first location. In some embodiments, the support locations are arranged near the ends of the shaft 14.

In some embodiments, the loading mechanism 40 is located between the first support 20 and the second support 22. In some embodiments, the loading mechanism 40 is centered between the first support 20 and the second support 22, for example being located at the midpoint of a distance between the supports 20, 22.

In some embodiments, the first support 20 comprises a non-contact bearing 50 arranged to support the shaft 14. In some embodiments, the second support 22 comprises a non-contact bearing 50 arranged to support the shaft 14. In some embodiments, the loading mechanism 40 comprises a non-contact bearing 50 arranged to apply a load to the shaft 14. In some embodiments, each portion of the device 10 that supports or loads the shaft 14 comprises a non-contact bearing 50. Any suitable non-contact bearing 50 mechanism(s) can be used. In some embodiments, a non-contact bearing 50 used in a support 20 is different from a non-contact bearing 50 used in the loading mechanism 40. In some embodiments, a non-contact bearing 50 comprises a pneumatic bearing arranged to support the workpiece 14 with a gas such as air.

Desirably, the non-contact bearings 50 allow the device 10 to support and load the shaft 14 without contacting the shaft 14 or influencing rotation of the shaft 14. This allows the shaft 14 to deform in accordance with its natural composition, freely rotating and allowing the loading member 40 to produce the largest lateral deflection.

In some embodiments, the device 10 comprises one or more fluid conduits 60 arranged to supply a fluid to a non-contact bearing 50. In some embodiments, the supplied fluid becomes oriented between the shaft 14 and support 20. In some embodiments, the fluid comprises a gas such as air. In some embodiments, a fluid conduit 60 is arranged to supply a continuous flow of fluid to the non-contact bearing 50. In some embodiments, a fluid conduit is arranged to supply a flow of pressurized fluid, such as pressurized air, to the non-contact bearing 50.

In some embodiments, the device 10 comprises a main fluid conduit 62 and a plurality of branch fluid conduits 64. In some embodiments, the main fluid conduit 62 receives a supply of fluid and extends to a manifold 68. In some embodiments, the manifold 68 distributes fluid between the branch fluid conduits 64. In some embodiments, a branch fluid conduit 64 extends from the manifold 68 to a support 20, 22 or a loading mechanism 40. In some embodiments, the manifold 68 and/or branch fluid conduits 64 are arranged to provide a greater amount of fluid flow to the loading mechanism 40 than to either support 20, 22.

In some embodiments, the device 10 comprises a throttle 70 arranged to control the amount of fluid supplied to the non-contact bearings 50. In some embodiments, a throttle 70 is used on the main fluid conduit 62. In some embodiments, throttle(s) 70 can be used on one or more branch fluid conduit(s) 64. In some embodiments, a throttle 70 can comprise a fluid valve, such as a metering valve, a shut-off valve, etc.

In some embodiments, the device 10 defines a reference axis 16. In some embodiments, the support(s) 20, 22 are aligned upon the axis 16. In some embodiments, a support 20, 22 comprises a cavity 26, and the cavities 26 are aligned on the axis 16. In some embodiments, a central axis of each of the cavities 26 are colinear and define the reference axis 16. In some embodiments, when a shaft 14 is supported by the supports 20, 22 and is not being deflected by the loading mechanism 40, a central axis of the shaft 14 is aligned upon the reference axis 16.

In some embodiments, the loading mechanism 40 is movable between first and second positions. In some embodiments, the device 10 comprises an actuation mechanism 48 arranged to move the loading mechanism 40, such as a toggle clamp. In some embodiments, the loading mechanism 40 is arranged to move in a direction orthogonal to the reference axis 16. In some embodiments, the loading mechanism 40 is arranged to apply a force to the shaft 14. In some embodiments, the force applied by the loading mechanism 40 is oriented orthogonal to the shaft 14. In some embodiments, force applied by the loading mechanism 40 causes to deflect in a direction lateral to the reference axis 16, for example as shown in FIG. 2.

In some embodiments, as the shaft 14 deflects, it remains free to rotate with respect to the device 10. This allows the shaft 14 to rotate and assume a rotational orientation that provides the least resistance and the greatest lateral deformation of the shaft 14, wherein a vector of the force applied by the loading mechanism is aligned with a weakest deflection vector for the shaft 14.

In some embodiments, each support 20, 22 is moveable with respect to other portions of the device 10, such as the loading mechanism 40. In some embodiments, each support 20, 22 is moveable along the reference axis 16. In some embodiments, the device 10 comprises a base 12. In some embodiments, a support 20, 22 is attached to the base 12. In some embodiments, a support 20, 22 is slidably attached to the base 12. In some embodiments, the base 12 comprises longitudinal track 18 such as a channel, rail or other suitable feature extending in a lengthwise direction of the base 12. In some embodiments, one or more supports 20, 22 are engaged with the longitudinal track 18. In some embodiments, one or more supports 20, 22 are moveable along the longitudinal track 18. In some embodiments, the longitudinal track 18 extends parallel to the reference axis 16.

In some embodiments, the distance between a first support 20 and a second support 22 is adjustable, for example to accommodate shafts 14 having different lengths.

In some embodiments, the device 10 comprises a support member 46 arranged to support the loading mechanism 40. In some embodiments, the support member 46 is attached to the base 12. In some embodiments, the support member 46 is engaged with the longitudinal track 18. In some embodiments, the support member 46 is moveable along the longitudinal track 18. In some embodiments, the support member 46 is fixedly attached to the base 12 and not moveable with respect to the base 12.

In some embodiments, the support member 46 comprises the actuation mechanism 48. In some embodiments, the support member 46 body supports the actuation mechanism 48 and the actuation mechanism 48 supports the loading mechanism 40.

Figure 3:
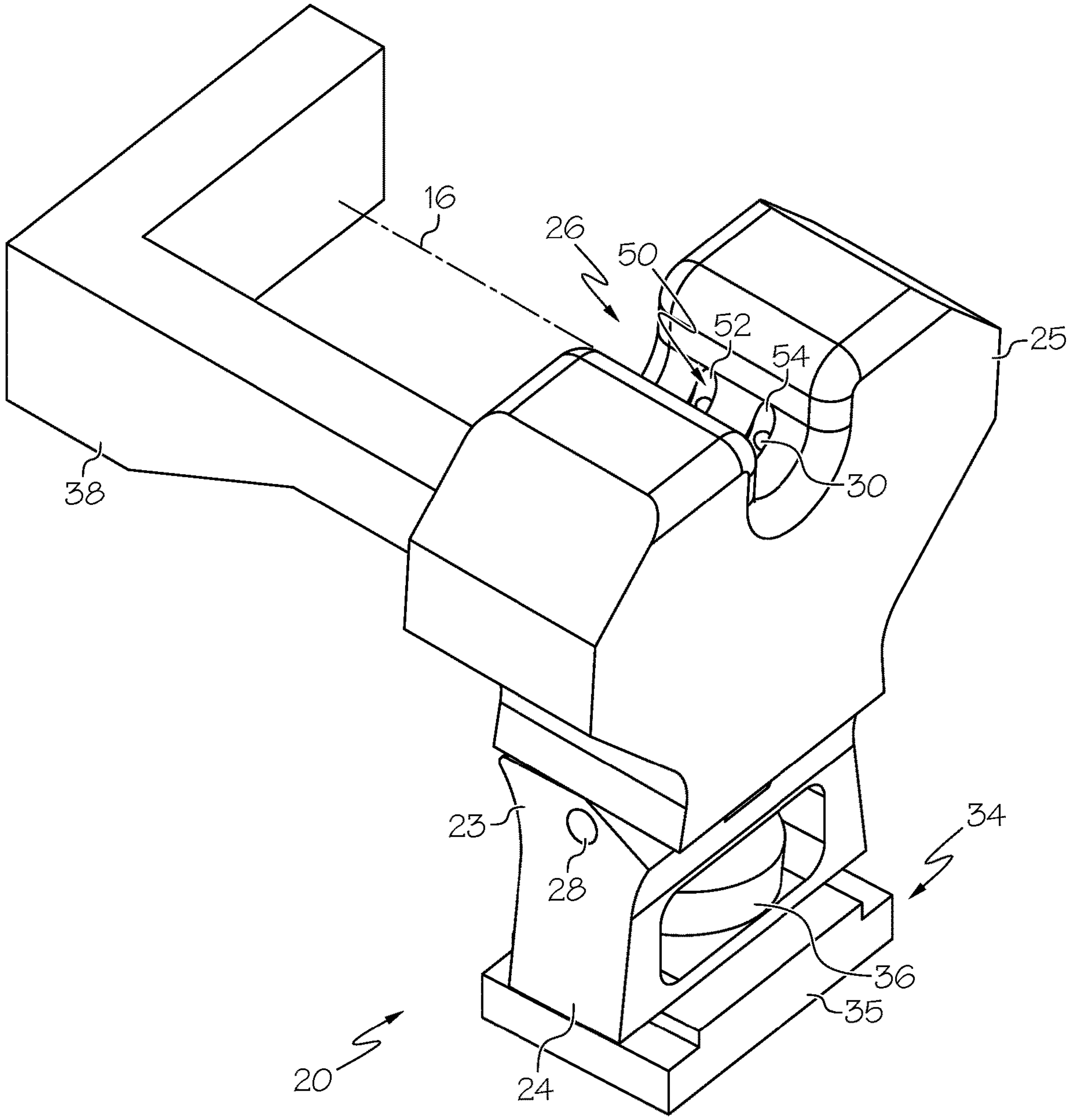
FIG. 3 shows an embodiment of a support.
Figure 4:
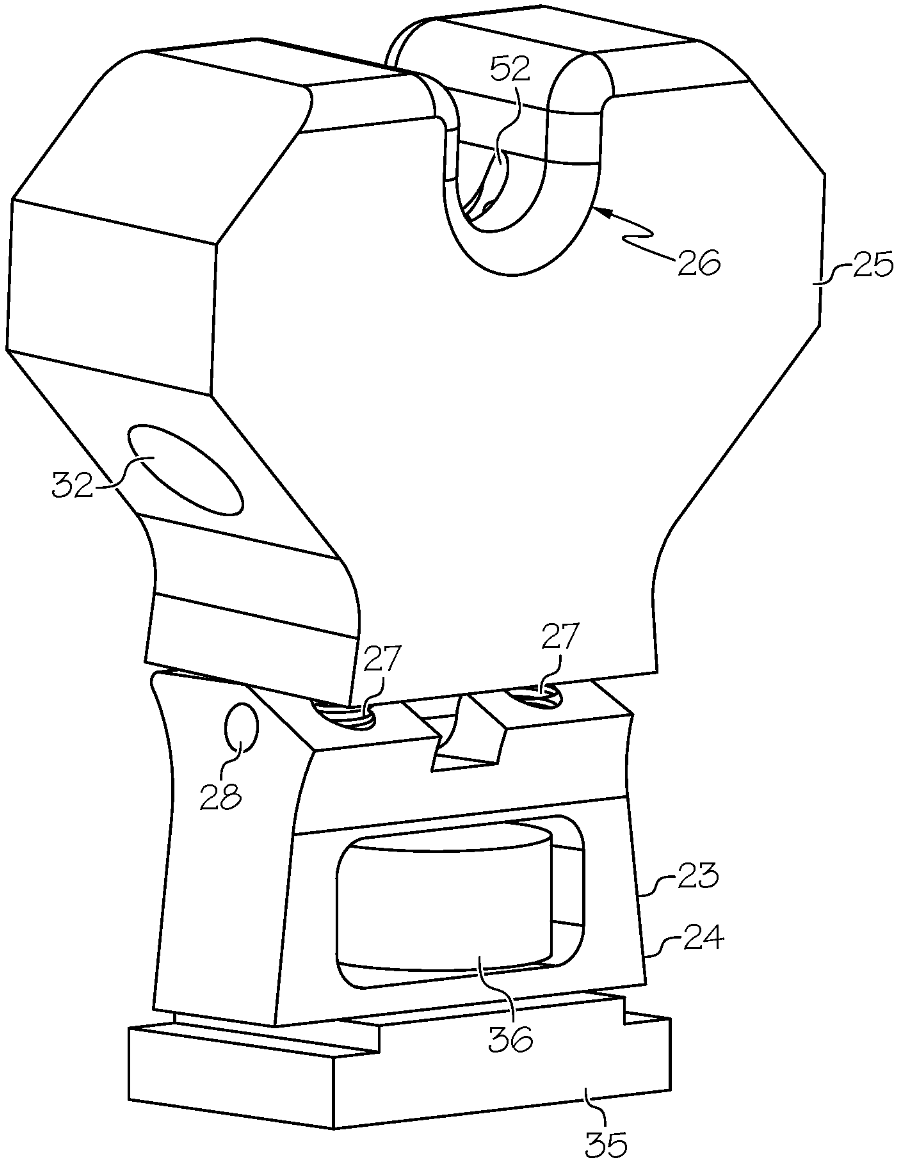
FIG. 4 shows an embodiment of a support.

FIGS. 3 and 4 show an embodiment of a support 20 and an embodiment of a non-contact bearing 50. In some embodiments, a support 20, 22 comprises a body 23 that is arranged to engage a portion of the device 10, such as the base 12, and is arranged to support the shaft 14.

In some embodiments, the body 23 comprises an engagement portion 34 arranged to engage a portion of the device 10, such as the base 12. In some embodiments, the engagement portion 34 is adjustable to achieve a releaseable, fixed connection between a support 20 and the base 12, thereby fixing the support 20 in place. The engagement portion 34 can comprise any suitable engagement mechanism for attaching the support 20 to the base 12. In some embodiments, the support 20 is attached to the base 12 with a fastener. In some embodiments, the engagement portion 34 comprises a structure arranged to engage a longitudinal track 18 in the base 12. For example, in some embodiments, a longitudinal track 18 comprises a dovetail slot, a T-slot or other suitable slot, and the engagement portion 34 comprises a dovetail fitting, a T-fitting 35 or another suitable complimentary fitting. In some embodiments, the engagement portion 34 comprises a dovetail nut or a T-nut 35 comprising a threaded aperture and the body 23 comprises an adjustable fastener 36 arranged to engage the T-nut 35. In some embodiments, turning the adjustable fastener 36 moves the T-nut 35 with respect to the body 23, allowing the engagement portion 34 to tighten a connection with the base 12.

In some embodiments, the body 23 comprises a solid material. In some embodiments, the body 23 comprises a non-porous material. In some embodiments, the body 23 comprises at least one fluid passageway 30 to provide fluid to a non-contact bearing 50.

In some embodiments, the body 23 comprises a cavity 26 arranged to receive the shaft 14. In some embodiments, the cavity 26 is formed in the non-porous material of the body 23, and the cavity 26 itself is not a non-contact bearing. In some embodiments, the support 20 is arranged to support and contain the shaft 14 in the cavity 26, for example when the non-contact bearing(s) are not on, for example if the non-contact bearing(s) are not being supplied with fluid. In some embodiments, at least a portion of the cavity 26 comprises an arcuate shape. In some embodiments, at least a portion of the cavity 26 comprises a semi-circular shape.

In some embodiments, a support 20, 22 comprises a stop 38. In some embodiments, a stop 38 is located adjacent to the cavity 26 and is arranged to limit travel of the shaft 14 in a direction along the reference axis 16. In some embodiments, a stop 38 is moveable with respect to the support 20, 22 and can be fixed in different positions (see e.g. FIG. 13).

In some embodiments, a stop 38 extends through an aperture in the support 20, and a fastener 39 can be used to secure the stop 38 in place.

In some embodiments, the body 23 comprises a first body portion 24 and a second body portion 25 that is moveable with respect to the first body portion 24. In some embodiments, the body 23 comprises a pivot 28 and the second body portion 25 is arranged to pivot with respect to the first body portion 24. In some embodiments, the first body portion 24 comprises the engagement portion 24 and the second body portion 25 comprises the non-contact bearing 50. The pivoting body arrangement allows a portion of the support 20 to move in response to deflection of the shaft 14.

In some embodiments, the second body portion 25 is moveable with respect to the first body portion 23 between first and second positions. In some embodiments, in the first position, a central axis of the cavity 26 is aligned with the reference axis 16. In some embodiments, in the second position, a central axis of the cavity 26 is oriented at an angle to the reference axis 16, for example as shown in FIG. 2. In some embodiments, the first support 20 and the second support 22 have similar shapes and configurations but face opposite directions. In some embodiments, the first support 20 and second support 22 are both arranged to pivot inwardly, for example each leaning toward the loading mechanism 40.

In some embodiments, the body 23 comprises a biasing member 27 arranged to bias the second body portion 25 to its first position. In some embodiments, the biasing member 27 comprises a spring. In some embodiments, the biasing member 27 comprises a compression spring.

In some embodiments, a support 20, 22 comprises a solid body structure that does not allow the non-contact bearing 50 to change orientation. In some embodiments, a central axis of a non-contact bearing 50 of a support 20, 22 remains collinear with the axis 16 during shaft deflection.

The supports 20, 22 can each comprise any suitable type of non-contact bearing 50. In some embodiments, a non-contact bearing 50 comprises an air bearing. In some embodiments, a non-contact bearing 50 comprises an aerostatic bearing. In some embodiments, a flow of pressurized gas is supplied to the non-contact bearing 50 and injected between the workpiece 14 and the non-contact bearing 50. In some embodiments, pressurized gas can elastically deform a portion of the shaft 14 and/or a portion of the non-contact bearing 50 to create a clearance between the objects. In some embodiments, a support 20 comprises at least one inlet 32 arranged to receive pressurized fluid, for example being arranged to receive a fluid conduit 60. In some embodiments, the inlet 32 is in fluid communication with an outlet aperture 54. In some embodiments, an inlet 32 is in fluid communication with a plurality of outlet apertures 54. In some embodiments, a support 20 comprises multiple inlets 32, and each inlet 32 is in fluid communication with at least one outlet aperture 54.

In some embodiments, the non-contact bearing 50 comprises a discrete outlet aperture, for example being formed in a surface that defines the cavity 26. In some embodiments, the non-contact bearing 50 comprises a groove 52 or slot, for example formed in a surface that defines the cavity 26. In some embodiments, an outlet aperture 54 delivers fluid to the groove 52 and the groove 52 distributes and delivers fluid to provide non-contact support to the shaft 14. In some embodiments, a groove 52 comprises multiple outlet apertures 54. In some embodiments, a groove 52 comprises a first outlet aperture 54 and a second outlet aperture 54, wherein the first outlet aperture 54 is fed by a first inlet 32 and the second outlet aperture 54 is fed by a second inlet 32.

In some embodiments, a non-contact bearing 50 comprises a porous material arranged to allow fluids such as gasses to flow through the material. In some embodiments, a porous material comprises a porous metal such as stainless steel, brass, bronze, nickel and various alloys. In some embodiments, a porous material comprises a porous non-metal such as carbon fiber, fiberglass and composite materials. In some embodiments, a porous material can be made by sintering materials such as powdered metals. In some embodiments, a porous material can be made from a solid material, for example by selective material removal, micro-drilling, laser-drilling, laser ablation, etc. In some embodiments, a porous material comprises a material known to be used for pneumatic mufflers, pneumatic filters, etc.

In some embodiments, a support 20 comprises a solid material defining a groove 52, and a porous material is oriented in the groove 52. The porous material is arranged to receive a flow of air from an inlet 32 and the porous material comprises an outlet. In some embodiments, a porous material delivers a flow of air via several small outlets distributed across a surface of the porous material.

In some embodiments, a non-contact bearing 50 can be arranged as described in US 2014/0286599 and/or US 2016/0265588, the entire disclosures of which are hereby incorporated herein by reference.

A non-contact bearing 50 can be arranged to support any suitable portion of the shaft 14. In some embodiments, a non-contact bearing 50 is arranged to provide support to at least an area around the vector of the force applied by the support 20 to the shaft 14. In some embodiments, a non-contact bearing 50 is arranged to provide support along an arc that extends along a surface of the shaft 14. In various embodiments, a non-contact bearing 50 is arranged to provide support along an arc that extends at least 20 degrees, 30 degrees, 45 degrees, 90 degrees, 135 degrees, 180 degrees or more. In some embodiments, a non-contact bearing 50 is arranged to fully surround the shaft 14 and provide non-contacting support to a full circumference of the shaft 14.

In some embodiments, the loading mechanism 40 comprises a cavity 26. In various embodiments, a cavity 26 of the loading mechanism 40 can include any feature described with respect to a cavity 26 of a support 20. In various embodiments, a non-contact bearing 50 of the loading mechanism 40 can include any feature described with respect to a non-contact bearing 50 of a support 20.

Figure 5:
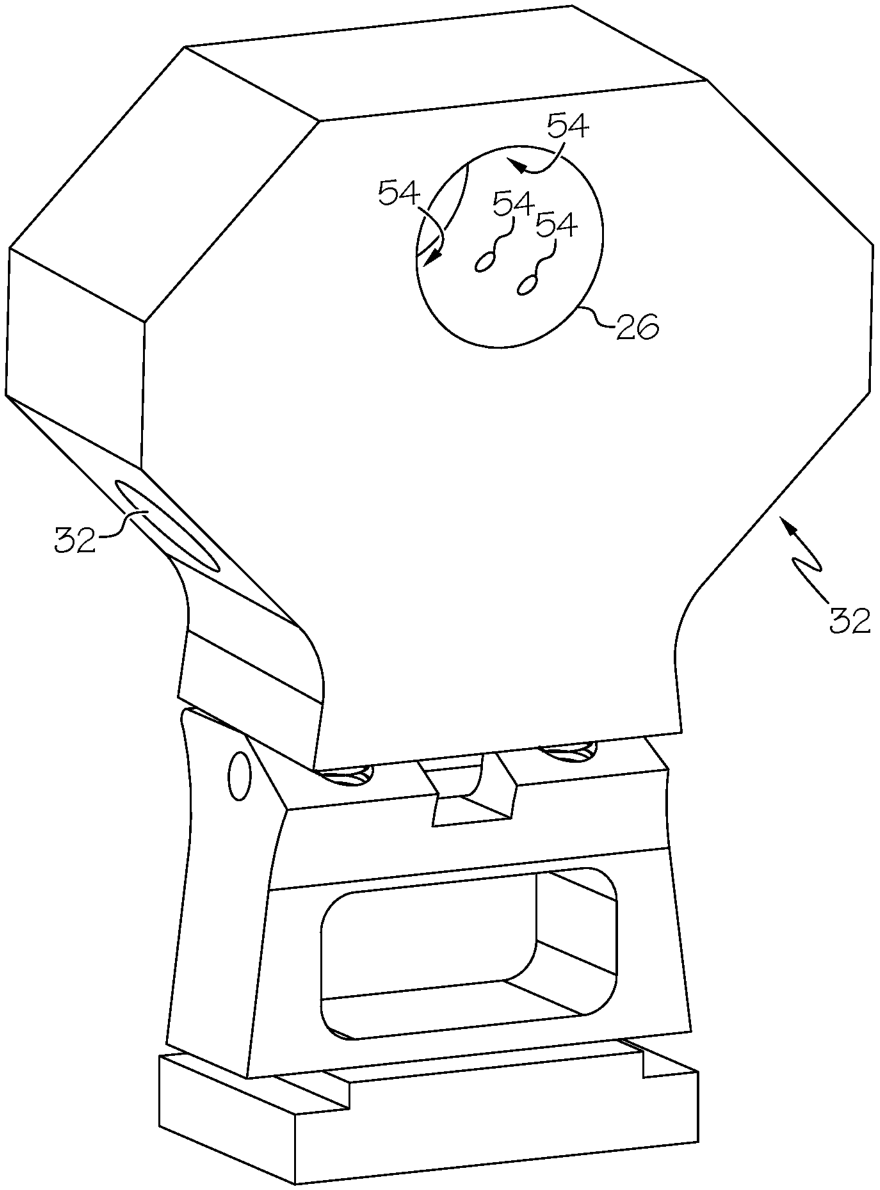
FIG. 5 shows another embodiment of a support.

FIG. 5 shows another embodiment of a support 20. In some embodiments, a support 20 comprises a structure that fully surrounds a shaft 14. In some embodiments, a support 20 comprises a non-contact bearing 50 that fully surrounds a shaft 14. In some embodiments, outlet apertures 54 are distributed around an inner surface of the cavity 26. In some embodiments, outlet apertures 54 are distributed around an inner circumference of the cavity 26.

Figure 6:
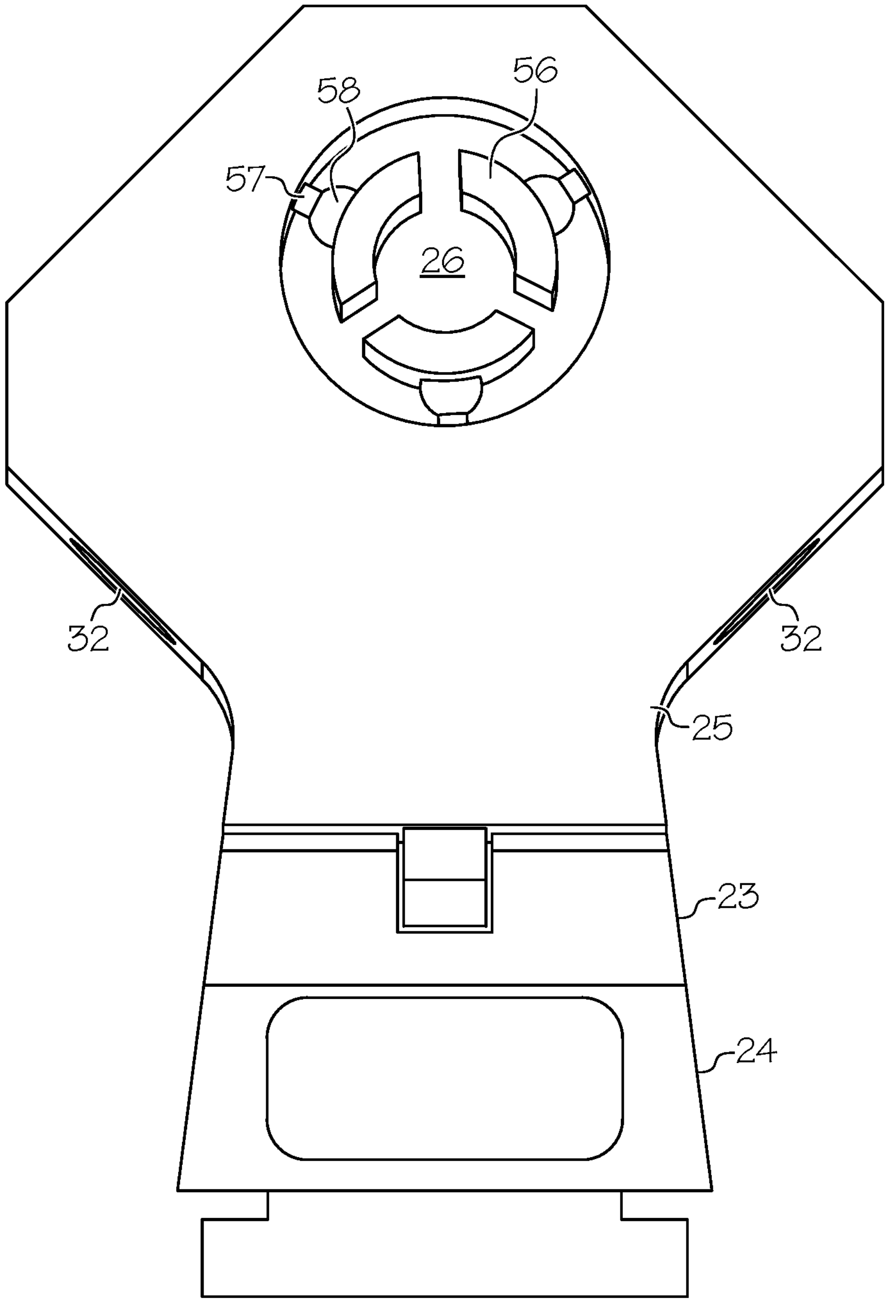
FIG. 6 shows another embodiment of a support.
Figure 7:
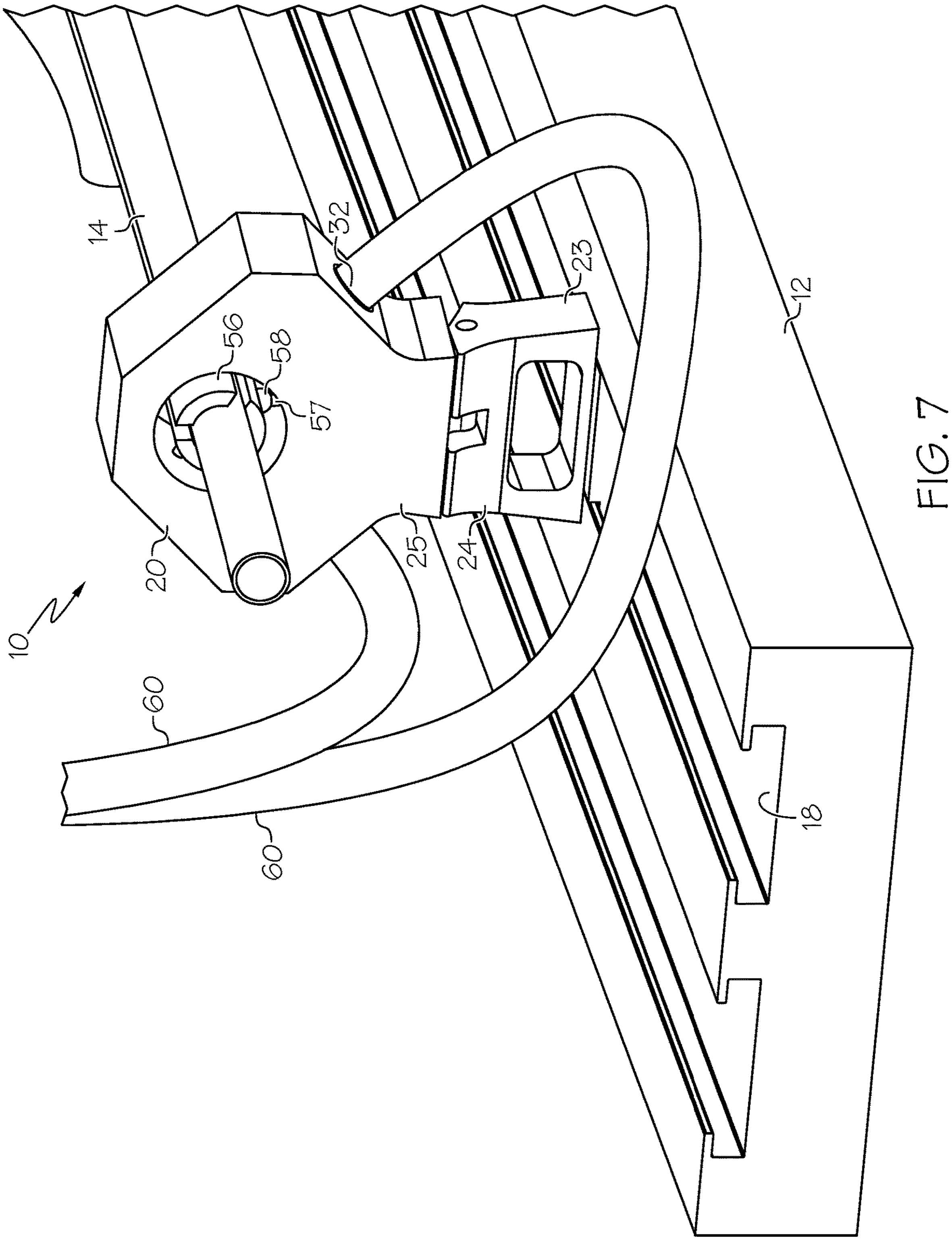
FIG. 7 shows a portion of an embodiment of a testing device.

FIG. 6 shows another embodiment of a support 20. FIG. 7 shows an embodiment of a testing device 10 with supports 20 as shown in FIG. 6. In some embodiments, a non-contact bearing 50 comprises a moveable portion 56 that is moveable with respect to the body 23 of the support 20. In some embodiments, a non-contact bearing 50 comprises a stem 57 arranged to receive fluid from a fluid supply line (e.g. via inlet 32). In some embodiments, the moveable portion 56 is moveable with respect to the stem 57. In some embodiments, the stem 57 comprises a ball 58 and the moveable portion 56 is moveable upon the ball 58. This arrangement allows the moveable portion 56 to assume various orientations as necessary to support a shaft 14. In some embodiments, the moveable portion 56 comprises one or more outlet apertures 54. In some embodiments, the moveable portion 56 comprises a porous material arranged to deliver a flow of fluid such as air to the cavity 26.

In some embodiments, a moveable portion 56 comprises an arcuate shape that extends along an outer surface of the shaft 14. In some embodiments, a non-contact bearing 50 comprises a plurality of moveable portion 56 supports arranged to collectively support a shaft 14.

In some embodiments, a non-contact bearing 50 is moveable with respect to the support body 23 using structures disclosed in US 2014/0286599.

Figure 8:
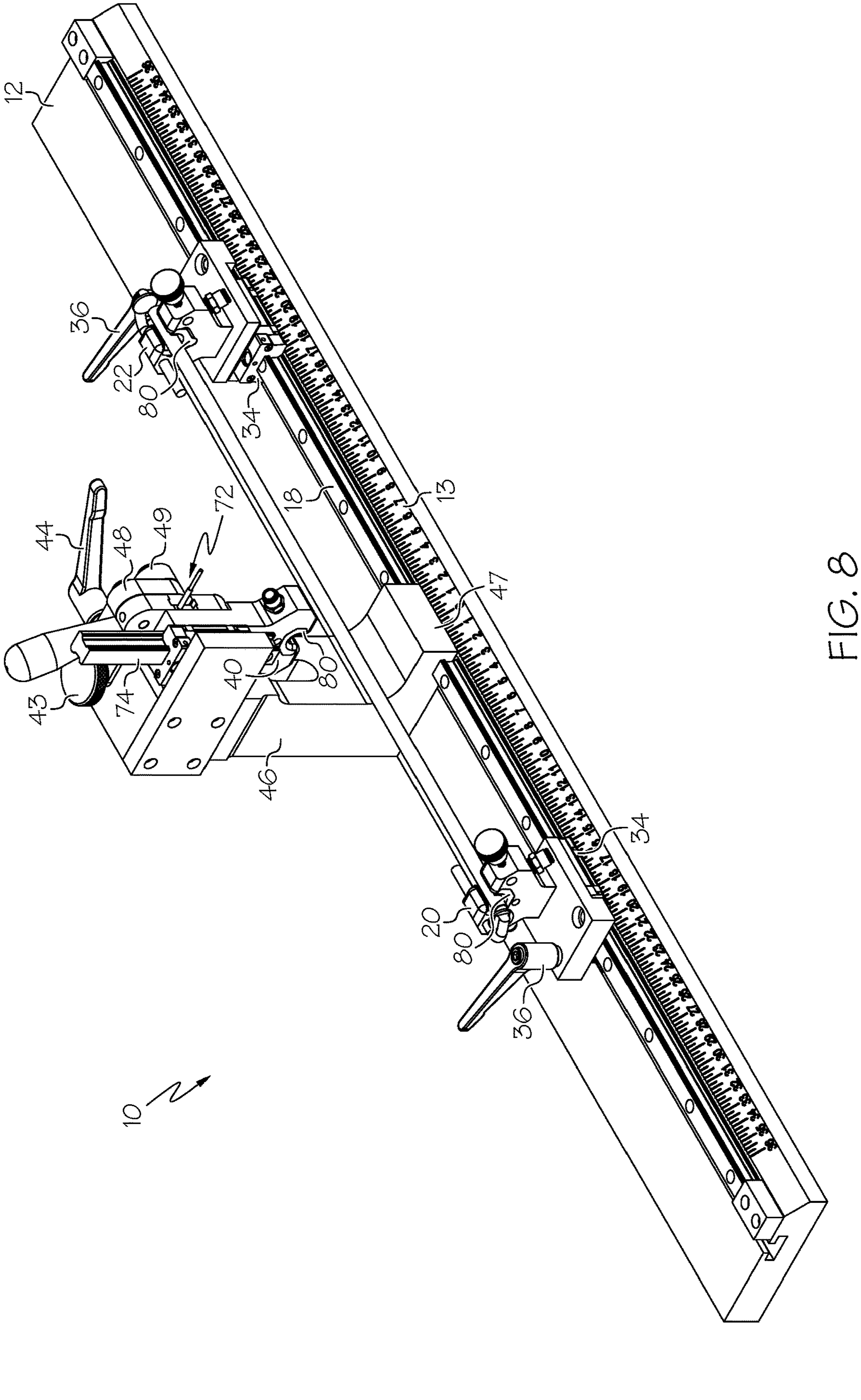
FIG. 8 shows another embodiment of a testing device.
Figure 9:
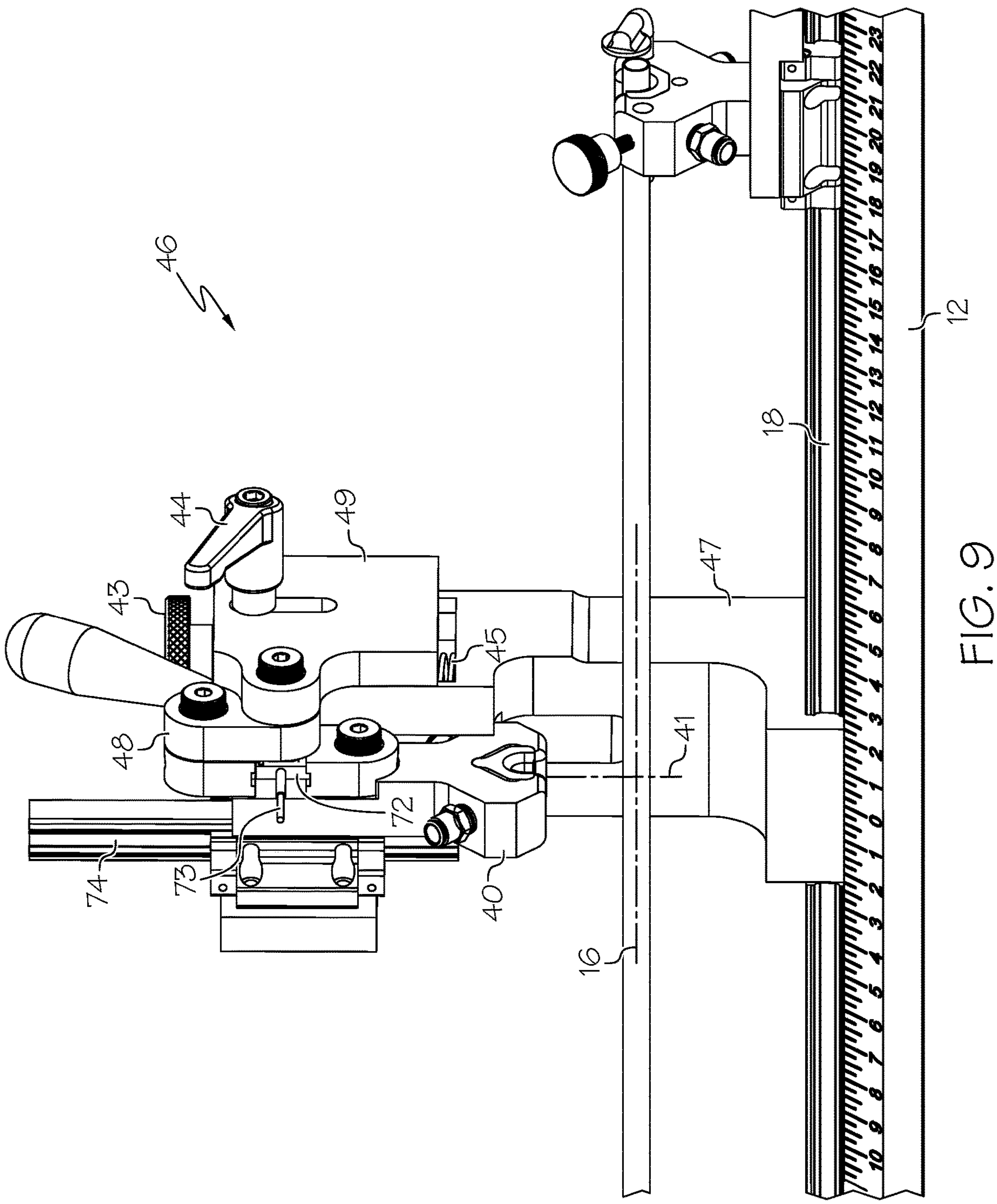
FIG. 9 shows an embodiment of a loading mechanism.

FIG. 8 shows another embodiment of a testing device 10. In some embodiments, the device 10 comprises a scale 13. In some embodiments, the base 12 comprises the scale 13. In some embodiments, the scale 13 comprises a zero point that is aligned with a center of the loading mechanism 40 (e.g. a center of a non-contact bearing 50 of the loading mechanism 40). In some embodiments, the scale 13 increases as the scale 13 is traversed in either direction away from the zero point, which helps to allow the supports 20, 22 to be placed at equal distances from the loading mechanism 40.

In some embodiments, the base 12 comprises a longitudinal track 18 that comprises a raised rail. In some embodiments, each support 20, 22 is slidably engaged with the raised rail and moveable along the length of the raised rail. In some embodiments, a support 20, 22 comprises an engagement portion 34 arranged to engage the raised rail. In some embodiments, a length of the engagement portion 34 exceeds a length of the non-contact bearing 50, which allows the base to provide greater stability to the support 20, 22.

FIGS. 8-11 show views of another embodiment of a support member 46 for a loading mechanism 40. In some embodiments, the support member 46 comprises a positioning mechanism 49 arranged to reposition the actuation mechanism 48 and loading mechanism 40 with respect to the base 12. This allows the specific location of the loading mechanism 40 to be adjusted with respect to the reference axis 16, for example when the device 10 is reconfigured for workpieces 14 and/or non-contact bearings 50 of different sizes.

In some embodiments, the loading mechanism 40 is arranged to move along an axis 41. In some embodiments, the axis 41 is oriented orthogonal to the reference axis 16. In some embodiments, operating the actuation mechanism 48 moves the loading mechanism 40 along the axis 41 between first and second positions.

In some embodiments, the support member 46 comprises a first portion 47 attached to the base 12. In some embodiments, the support member 46 comprises a guide member 74 attached to the first portion 47. In some embodiments, the loading mechanism 40 is slidably engaged with the guide member 74, and the guide member 74 stabilizes and guides the loading mechanism 40 along the axis 41.

In some embodiments, the support member 46 comprises a second portion 49 that is moveable with respect to the first portion 47. In some embodiments, the second portion 49 is engaged with the actuation mechanism 48. In some embodiments, the loading mechanism 40 and the actuation mechanism 48 are arranged to move with the second portion, and moving the second portion 49 with respect to the first portion 47 repositions the loading mechanism 40 with respect to the reference axis 16.

In some embodiments, the first portion 47 supports the second portion 49. In some embodiments, the second portion 49 is slidably engaged with the first portion 47 and arranged to move in a direction parallel to the axis 41. In some embodiments, the second portion 49 supports the actuation mechanism 48 and the actuation mechanism 48 supports the loading mechanism 40.

In some embodiments, the second portion 49 is moveable with respect to the first portion 47 between first and second positions. In some embodiments, the support member 46 comprises a biasing mechanism 45, such as a spring, arranged to bias the second portion to the first position. In some embodiments, the support member 46 comprises an adjustment mechanism 43 arranged to adjust the position of the second portion 49 with respect to the first portion 47.

Figure 10:
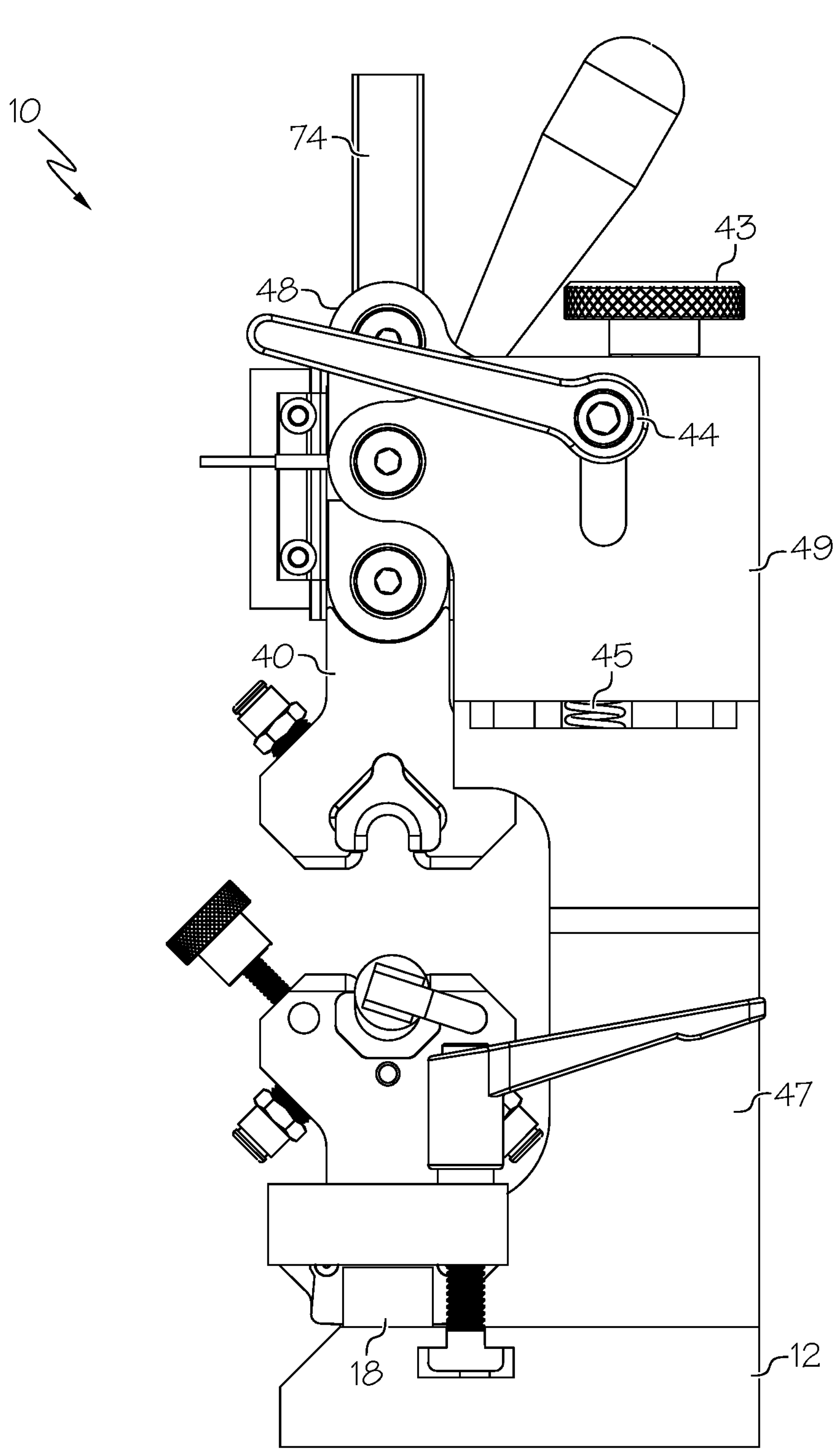
FIG. 10 shows a side view of an embodiment of a testing device.
Figure 11:
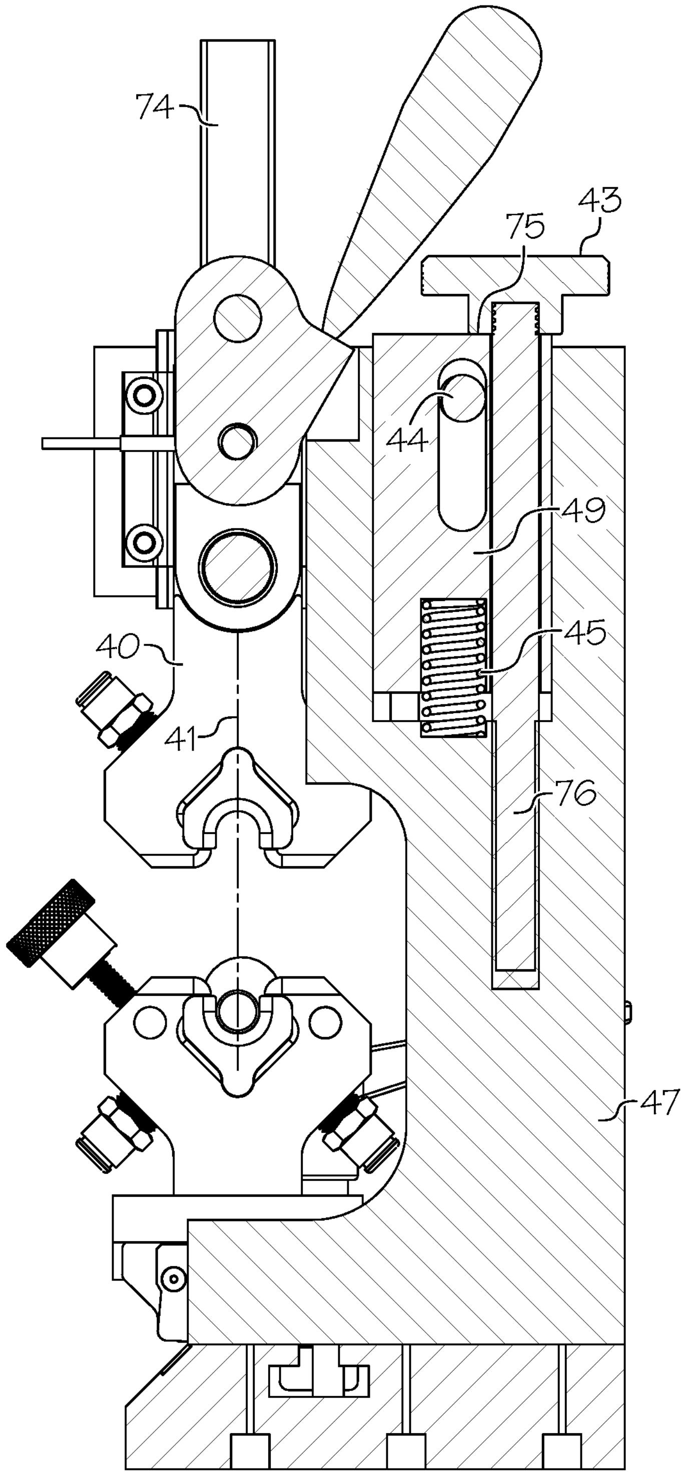
FIG. 11 shows a sectional view similar to FIG. 10.

FIG. 10 shows a side view of the embodiment of the support member 46 of FIG. 8 and FIG. 11 shows a sectional view.

In some embodiments, the adjustment mechanism 43 is arranged to contact the second portion 49 and is engaged with the first portion 47. In some embodiments, the adjustment mechanism 43 comprises a contacting surface 75 that acts as a stop for the second portion 49. In some embodiments, the biasing mechanism 45 biases the second portion 49 against the contacting surface 75. In some embodiments, the adjustment mechanism 43 comprises a shaft 76 that is threadably engaged with the first portion 47. In some embodiments, movement of the adjustment mechanism 43 (e.g. rotation) with respect to the first portion 47 moves the contacting surface 75 closer to, or away from, the first portion 47. Rotation of the adjustment mechanism 43 can provide fine adjustment of the specific location of the loading mechanism 40 along the axis 41.

In some embodiments, the support member 46 comprises a locking mechanism 44 arranged to fix the position of the second portion 47 with respect to the first portion 47. In some embodiments, the locking mechanism 4 comprises a fastener arranged to tighten the second portion 49 against the first portion 47.

Referring again to FIGS. 8 and 9, in some embodiments, the loading mechanism 40 comprises a force sensing mechanism 72. In some embodiments, a force sensing mechanism 72 is arranged to measure an amount of reaction force that a loaded workpiece applies back to the loading mechanism 40. Any suitable force sensing mechanism 72 can be used. In some embodiments, a force sensing mechanism 72 can be used to determine a compressive force present in the loading mechanism 40. In some embodiments, a force sensing mechanism 72 comprises a force transducer. In some embodiments, a force sensing mechanism 72 comprises a load cell. In some embodiments, a force sensing mechanism 72 comprises a strain gauge. In some embodiments, a force sensing mechanism 72 comprises a Mini S-Beam load cell available from Transcell Technology, Buffalo Grove, IL.

In some embodiments, a force sensing mechanism 72 comprises wiring 73 that attaches to a processor, display, etc.

Referring to FIGS. 8-15, in some embodiments, a loading mechanism 40 comprises an adapter 80, and the adapter 80 comprises a non-contact bearing 50. In some embodiments, a support 20, 22 comprises an adapter 80, and the adapter 80 comprises a non-contact bearing 50. In some embodiments, different adapters 80 can be provided, which comprise cavities 26 having different sizes, which can be used with different workpieces 14 that have different sizes (e.g. diameters).

Figure 12:
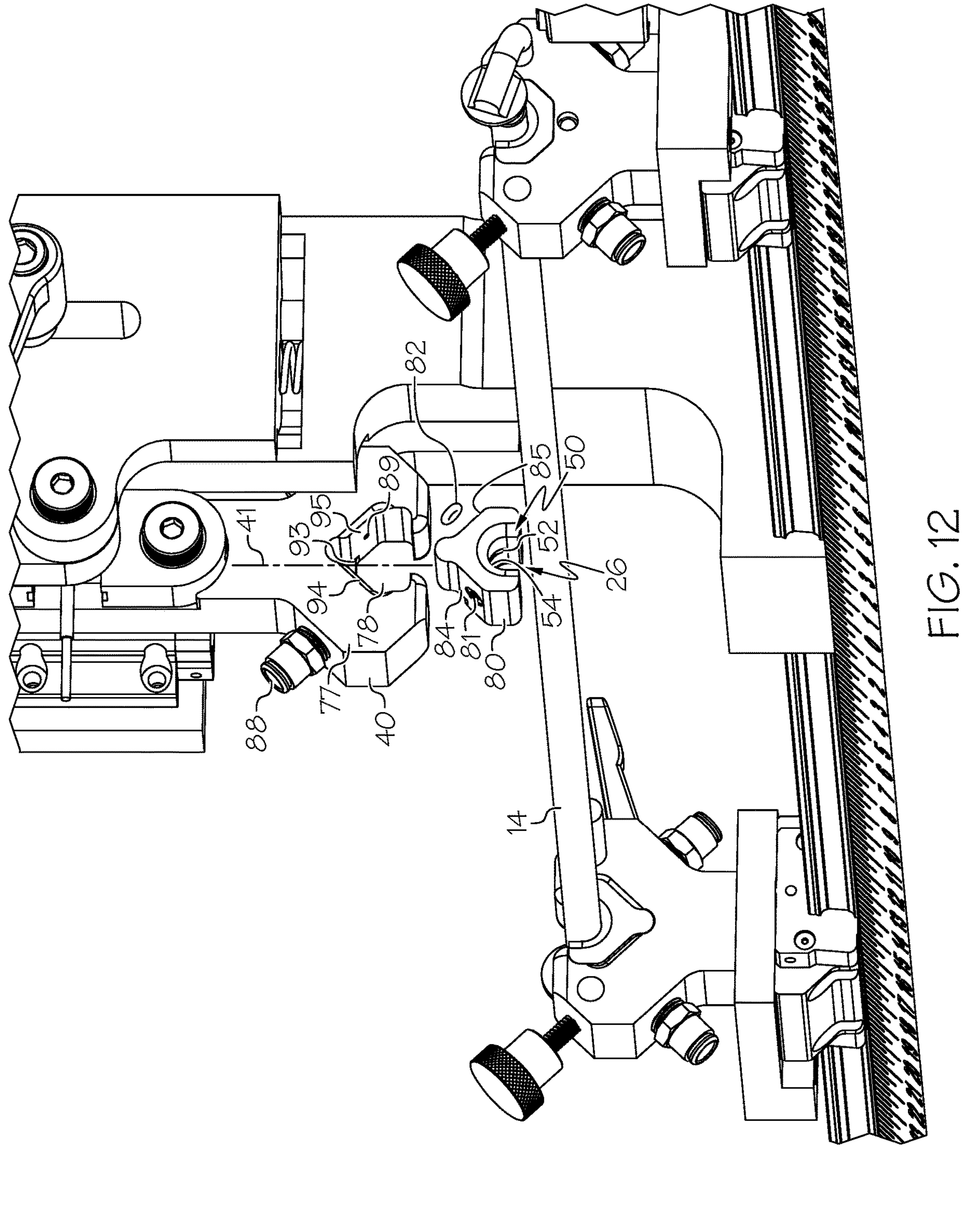
FIG. 12 shows an embodiment of a loading mechanism.
Figure 13:
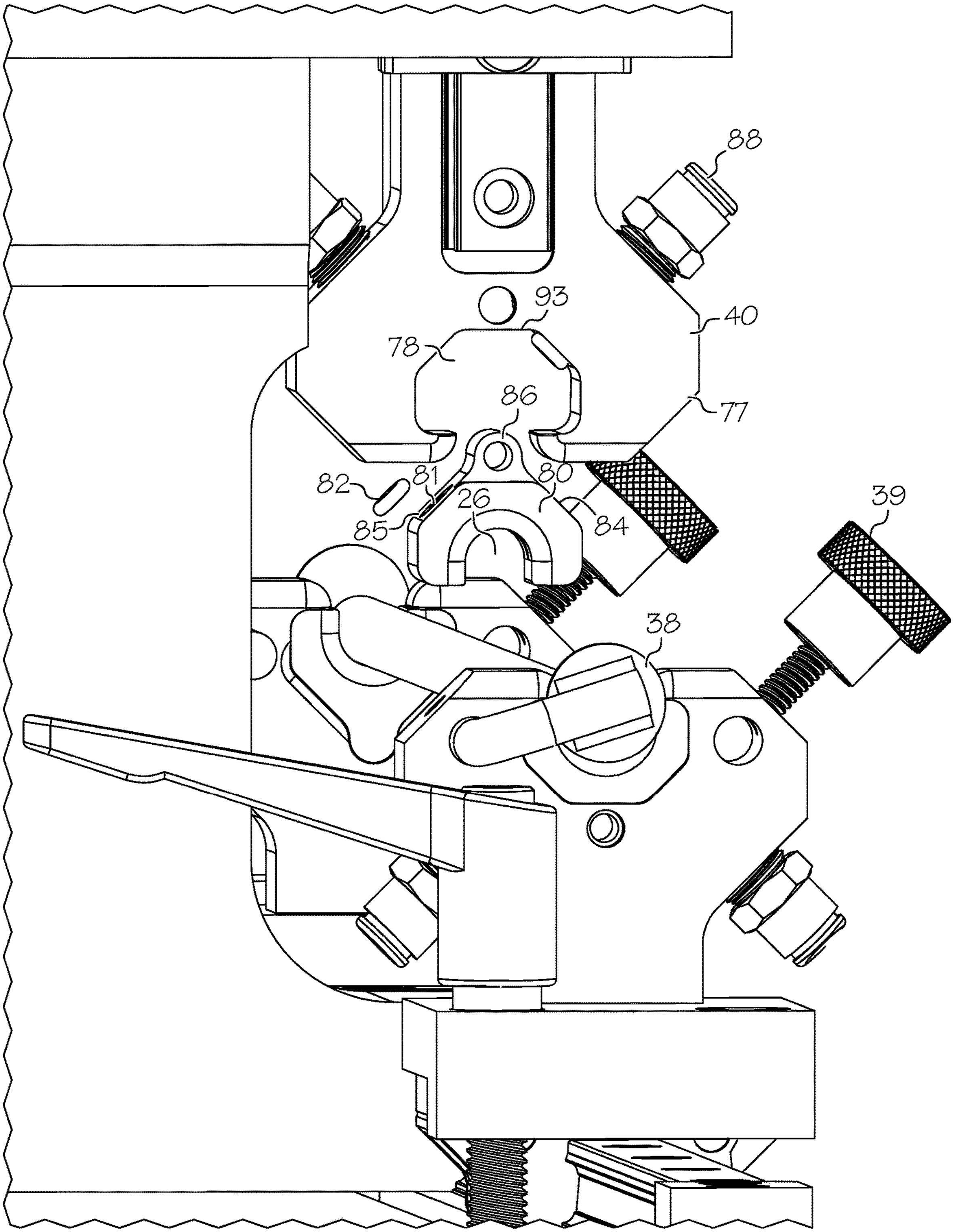
FIG. 13 shows another view of the embodiment of a loading mechanism shown in FIG. 12.

FIGS. 12 and 13 show views of an embodiment of a loading mechanism 40 comprising an adapter 80. In some embodiments, the loading mechanism 40 comprises a body member 77 comprising a receptacle 78. In some embodiments, the receptacle 78 is arranged to receive the adapter 80. In some embodiments, the adapter 80 comprises a non-contact bearing 50. In some embodiments, the adapter 80 comprises a cavity 26 arranged to receive a portion of a workpiece 14. In some embodiments, the adapter 80 comprises a groove 52 or slot, for example formed in a surface that defines the cavity 26. In some embodiments, an outlet aperture 54 delivers fluid to the groove 52 and the groove 52 distributes and delivers fluid to provide non-contact support to the shaft 14. In some embodiments, the adapter 80 comprises an inlet aperture 81 arranged to receive a fluid such as gas. Desirably, an inlet aperture 81 is in fluid communication with at least one outlet aperture 54. In some embodiments, the adapter 80 comprises a seal 82, such as an O-ring. In some embodiments, the seal 82 surrounds an inlet aperture 81. In some embodiments, the adapter 80 comprises recess that surrounds the inlet aperture 81, and the seal 82 is oriented in the recess.

In some embodiments, the receptacle 78 of the body member 77 of the loading mechanism 40 is arranged to receive the adapter 80. In some embodiments, the receptacle 78 comprises a non-circular shape and the adapter 80 comprises a complimentary non-circular shape. In some embodiments, the shapes of the receptacle 78 and adapter help to align the cavity 26 with the workpiece 14. In some embodiments, the adapter 80 comprises a first surface 84 and a second surface 85 that are opposed to one another and inclined with respect to the loading member 40 actuation axis 41. In some embodiments, the surfaces 84, 85 are symmetrical to one another with respect to a central axis of the cavity 26. In some embodiments, the receptacle 78 comprises a first surface 94 and a second surface 95 that are similarly inclined with respect actuation axis 41. In some embodiments, the surfaces 94, 95 of the receptacle 78 are complimentary to the surfaces 84, 85 of the adapter 80. In some embodiments, the first surfaces 84, 94 are arranged to abut one another and the second surfaces 85, 95 are arranged to abut one another.

In some embodiments, the body member 77 of the loading mechanism 40 comprises at least one inlet 88 arranged to receive fluid and at least one outlet 89. In some embodiments, an outlet 89 is in fluid communication with an inlet aperture 81 of the adapter 80, and the outlet 89 delivers fluid to the non-contact bearing 50. In some embodiments, an outlet 89 is formed in the first surface 94. In some embodiments, an outlet 89 is formed in the second surface 95.

In some embodiments, the body 77 of the loading mechanism 40 comprises a stop 93. In some embodiments, the adapter 80 comprises a surface 86 arranged to abut the stop 93. In some embodiments, the shapes of the receptacle 78 and adapter 80 provide a secure engagement between the body member 77 and the adapter 80, such that the device 10 can be used without a fastener attaching the adapter 80 to the body member 77. In some embodiments, a fastener can be used to attach the adapter 80 to the body member 77. In some embodiments, a fastener extends through the stop 93 and the surface 86.

Figure 14:
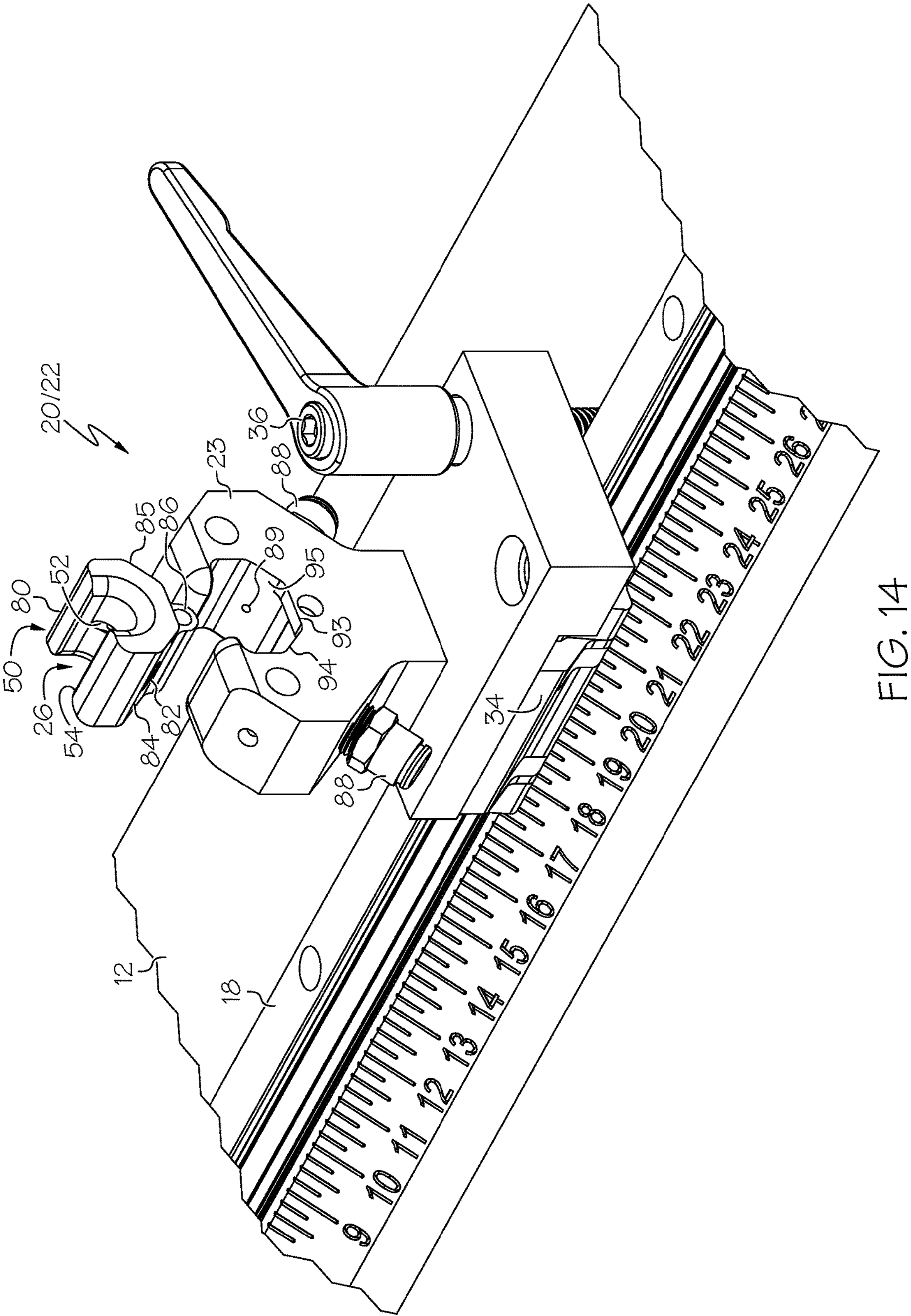
FIG. 14 shows an embodiment of a support.
Figure 15:
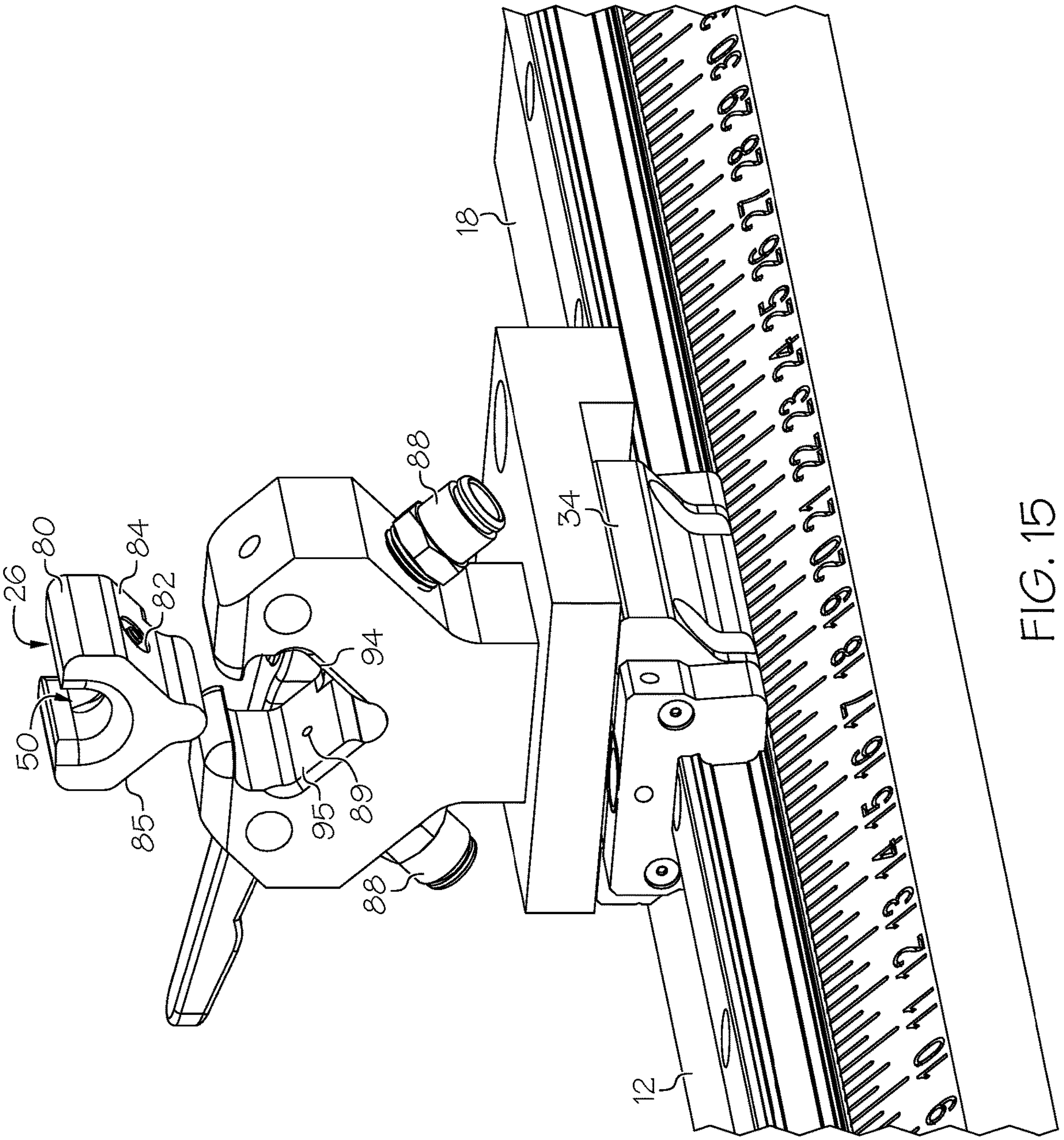
FIG. 15 shows another view of the embodiment of a support shown in FIG. 14.

FIGS. 14 and 15 show views of an embodiment of a support 20, 22 that comprises an adapter 80. In some embodiments, a support 20, 22 comprises a body 23 comprising a receptacle 78. A receptacle 78 formed in the body 23 of a support 20, 22 can comprise any and all features as described with respect to the receptacle 78 formed in the body 77 of the loading mechanism 40.

In some embodiments, an adapter 80 used in a support 20, 22 is sized and shaped the same as an adapter 80 used in the loading mechanism.

In some embodiments, a device 10 comprises a first set of adapters 80 wherein each non-contact bearing 50 cavity 26 comprises a first size, and a second set of adapters 80 wherein each non-contact bearing 50 cavity 26 comprises a second size different from the first size. The first set of adapters 80 can be used on workpieces of a first predetermined size, and the second set of adapters 80 can be used on workpieces of a second predetermined size.

The above disclosure is intended to be illustrative and not exhaustive. This description will suggest many variations and alternatives to one of ordinary skill in this field of art. All these alternatives and variations are intended to be included within the scope of the claims where the term “comprising” means “including, but not limited to.” Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A shaft testing device comprising:

a first support comprising a first air bearing, the first support arranged to support the shaft;

a second support comprising a second air bearing, the second support arranged to support the shaft; and a support member arranged to support an actuation mechanism and a loading mechanism, the loading mechanism comprising a loading air bearing, the loading mechanism arranged to apply a load to the shaft;

the actuation mechanism comprising a handle moveable with respect to the support member, the handle arranged to move the loading air bearing between a first predetermined position and a second predetermined position.

2. The shaft testing device of claim 1, comprising a base, the first support engaged with the base and the second support engaged with the base.

3. The shaft testing device of claim 2, the first support slidably engaged with the base.

4. The shaft testing device of claim 3, the second support slidably engaged with the base.

5. The shaft testing device of claim 2, the first support comprising a first body portion moveable with respect to a second body portion, the first body portion engaged with the base, the second body portion comprising the first air bearing.

6. The shaft testing device of claim 5, the first body portion pivotable with respect to the second body portion.

7. The shaft testing device of claim 5, the first support comprising a spring contacting the first body portion and the second body portion.

8. The shaft testing device of claim 5, the second support shaped similarly to the first support, the first support and second support having opposite orientation.

9. The shaft testing device of claim 1, the loading mechanism located between the first support and the second support.

10. The shaft testing device of claim 1, wherein the actuation mechanism supports the loading mechanism.

11. The shaft testing device of claim 1, comprising a fluid line in fluid communication with the first air bearing.

12. The shaft testing device of claim 11, comprising a fluid line in fluid communication with the loading air bearing.

13. The shaft testing device of claim 1, the first support comprising a body and an adapter, the adapter comprising the first air bearing.

14. The shaft testing device of claim 1, the loading mechanism comprising a body and an adapter, the adapter comprising the loading air bearing.

15. The shaft testing device of claim 1, the actuation mechanism comprising a toggle clamp.

16. The shaft testing device of claim 1, comprising an adjustment mechanism arranged to move the actuation mechanism and the loading air bearing with respect to the support member.

17. A shaft testing device comprising:

a support comprising a non-contact bearing, the support arranged to support the shaft; and a support member arranged to support an actuation mechanism and a loading mechanism, the loading mechanism comprising a non-contact bearing;

the actuation mechanism arranged to move the non-contact bearing of the loading mechanism with respect to the shaft between a first predetermined position and a second predetermined position, in the first predetermined position the non-contact bearing not engaged with the shaft, in the second predetermined position the loading mechanism applying a lateral load to the shaft.

18. The shaft testing device of claim 17, the non-contact bearing of the support comprising an air bearing.

19. The shaft testing device of claim 18, the non-contact bearing of the loading mechanism comprising an air bearing.

20. The shaft testing device of claim 17, comprising an adjustment mechanism arranged to move the actuation mechanism and loading mechanism with respect to the support member.

* * * * *